United States Patent
Trim et al.

(10) Patent No.: US 11,521,160 B2
(45) Date of Patent: Dec. 6, 2022

(54) INTELLIGENT VEHICLE DELIVERY

(71) Applicant: INTERNATIONAL BUSINESS MACHINES CORPORATION, Armonk, NY (US)

(72) Inventors: Craig M. Trim, Ventura, CA (US); Adam Lee Griffin, Dubuque, IA (US); Shikhar Kwatra, Research Triangle Park, NC (US); Joseph Kozhaya, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 16/439,914

(22) Filed: Jun. 13, 2019

(65) Prior Publication Data
US 2020/0394608 A1 Dec. 17, 2020

(51) Int. Cl.
*G06Q 10/08* (2012.01)
*B65G 67/24* (2006.01)
*B65G 67/04* (2006.01)

(52) U.S. Cl.
CPC ....... *G06Q 10/08355* (2013.01); *B65G 67/04* (2013.01); *B65G 67/24* (2013.01); *G06Q 10/0832* (2013.01)

(58) Field of Classification Search
CPC ......... G06Q 10/08355; G06Q 10/0832; B65G 67/04; B65G 67/24
See application file for complete search history.

(56) References Cited

U.S. PATENT DOCUMENTS 9,321,531 B1 * 4/2016 Takayama ............... B64C 39/02
9,625,909 B2 * 4/2017 Hu ........................... G08G 5/04
(Continued)

FOREIGN PATENT DOCUMENTS

CN 111788532 A * 10/2020 .......... B60W 30/095
CN 108137151 B * 9/2021 ........... B64C 39/024
(Continued)

OTHER PUBLICATIONS

Chester, Dolph, "Towards Explainability of UAV-Based Convolutional Neural Networks for Object Classification", published by 2018 Aviation Technology, Integration and Operation Conference in 2018 (Year: 2018).*
(Continued)

*Primary Examiner* — Omar Zeroaul
(74) *Attorney, Agent, or Firm* — Schmeiser, Olsen & Watts, LLP; Brian Restauro (57) ABSTRACT

A method and system for delivering a package is provided. The method includes receiving online order data comprising details associated with a product being ordered by a user. The online order data and environmental data associated with delivery of the product is analyzed and a resulting a travel route for delivering the product to a specified location of the user is generated. A delivery vehicle for delivering the product to the specified location of the user is selected and directed to a storage location of the product for loading. The delivery vehicle is directed from the storage location to the specified location of the user via the travel route. Delivery actions associated with the product with respect to the specified location are determined based on data indicating current environmental conditions. The delivery actions are executed.

18 Claims, 9 Drawing Sheets

(56) References Cited

U.S. PATENT DOCUMENTS

| | | | |
|---|---|---|---|
| 9,959,771 B1* | 5/2018 | Carlson | G08G 5/0039 |
| 10,032,384 B1* | 7/2018 | Boyd | G08G 5/0069 |
| 10,182,225 B1* | 1/2019 | Cui | H04N 5/2258 |
| 10,248,120 B1* | 4/2019 | Siegel | G05D 1/0022 |
| 10,698,409 B1* | 6/2020 | Siegel | G05D 1/0246 |
| 10,834,523 B1* | 11/2020 | Rao | B64C 39/024 |
| 10,915,105 B1* | 2/2021 | Likhterman | G08G 1/0112 |
| 10,962,372 B1* | 3/2021 | Rao | G06N 3/0454 |
| 10,997,544 B1* | 5/2021 | Bar-Zeev | B64F 1/18 |
| 11,086,338 B2* | 8/2021 | Bokeno | B64C 39/024 |
| 11,151,509 B1* | 10/2021 | Mishra | G06Q 10/08355 |
| 11,173,605 B2* | 11/2021 | Kim | G05B 19/41895 |
| 11,222,299 B1* | 1/2022 | Baalke | G06Q 10/087 |
| 11,232,394 B1* | 1/2022 | Pinette | H04L 67/306 |
| 2015/0120094 A1 | 4/2015 | Kimchi et al. | |
| 2015/0348282 A1* | 12/2015 | Gibbon | G06T 7/62 382/103 |
| 2015/0370251 A1* | 12/2015 | Siegel | B64C 39/024 701/2 |
| 2016/0033966 A1 | 1/2016 | Farris et al. | |
| 2016/0247404 A1* | 8/2016 | Srivastava | B64C 39/024 |
| 2016/0307449 A1* | 10/2016 | Gordon | G05D 1/106 |
| 2017/0011340 A1* | 1/2017 | Gabbai | G08G 5/0034 |
| 2017/0050748 A1* | 2/2017 | Byers | H04W 4/021 |
| 2017/0090484 A1 | 3/2017 | Obaidi | |
| 2017/0203857 A1* | 7/2017 | O'Toole | G06Q 10/083 |
| 2017/0241791 A1* | 8/2017 | Madigan | G06Q 40/08 |
| 2017/0286892 A1* | 10/2017 | Studnicka | B64C 39/024 |
| 2017/0293991 A1* | 10/2017 | High | B64D 1/22 |
| 2017/0301220 A1* | 10/2017 | Jarrell | G05D 1/0022 |
| 2017/0323129 A1* | 11/2017 | Davidson | G05D 1/0234 |
| 2018/0090016 A1* | 3/2018 | Nishi | G08G 5/0052 |
| 2018/0111683 A1* | 4/2018 | Di Benedetto | H04N 5/772 |
| 2018/0121875 A1* | 5/2018 | Satyanarayana Rao | G06Q 10/08355 |
| 2018/0137454 A1* | 5/2018 | Kulkarni | G05D 1/0027 |
| 2018/0139152 A1* | 5/2018 | Shaw | H04W 84/18 |
| 2018/0144302 A1* | 5/2018 | Murray | G07C 9/37 |
| 2018/0157258 A1* | 6/2018 | O'Brien | G05D 1/0088 |
| 2018/0158022 A1* | 6/2018 | Fu | G06Q 10/08355 |
| 2018/0196422 A1* | 7/2018 | Chow | G06Q 10/0834 |
| 2018/0204177 A1 | 7/2018 | Ferla | |
| 2018/0246529 A1* | 8/2018 | Hu | G05D 1/0016 |
| 2018/0276485 A1* | 9/2018 | Heck | G01C 21/3461 |
| 2018/0281946 A1* | 10/2018 | Obaidi | G05D 1/104 |
| 2018/0292214 A1* | 10/2018 | Zhang | G06T 7/246 |
| 2018/0292374 A1* | 10/2018 | Dittberner | G01N 21/3504 |
| 2018/0300834 A1* | 10/2018 | High | B64C 39/024 |
| 2018/0341909 A1* | 11/2018 | Stuckman | G06Q 10/0835 |
| 2018/0364713 A1 | 12/2018 | Foster, II | |
| 2019/0023416 A1* | 1/2019 | Borko | B65G 1/0485 |
| 2019/0041852 A1* | 2/2019 | Schubert | G06N 3/0454 |
| 2019/0046816 A1* | 2/2019 | Browning | G05B 19/0428 |
| 2019/0382111 A1* | 12/2019 | Schwartz | B64C 39/024 |
| 2019/0389575 A1* | 12/2019 | Kirkbride | G06Q 10/047 |
| 2020/0050188 A1* | 2/2020 | Bash | B64D 25/00 |
| 2020/0080865 A1* | 3/2020 | Ervin | G01C 21/3667 |
| 2020/0117201 A1* | 4/2020 | Oetken | G05D 1/0214 |
| 2020/0130828 A1* | 4/2020 | Pandit | G08G 5/0091 |
| 2020/0130833 A1* | 4/2020 | Miller | B64D 1/22 |
| 2020/0167722 A1* | 5/2020 | Goldberg | B64C 39/024 |
| 2020/0216196 A1* | 7/2020 | Sohmshetty | B64C 39/024 |
| 2020/0349852 A1* | 11/2020 | DiCosola | G06Q 20/20 |
| 2020/0364663 A1* | 11/2020 | Colella | G01C 21/3423 |
| 2020/0394605 A1* | 12/2020 | Daley | G06Q 10/0833 |
| 2021/0031913 A1* | 2/2021 | Martel | B64C 27/52 |
| 2021/0224739 A1* | 7/2021 | Sweeny | G06Q 10/083 |
| 2021/0304343 A1* | 9/2021 | Spjuth | B64C 39/024 |
| 2021/0318121 A1* | 10/2021 | Laroche | G01S 17/89 |
| 2021/0356967 A1* | 11/2021 | Gu | G01C 21/20 |
| 2021/0385036 A1* | 12/2021 | Bae | H04L 5/0094 |

FOREIGN PATENT DOCUMENTS

| | | | | |
|---|---|---|---|---|
| WO | WO-2018090209 A1 * | 5/2018 | | G05D 1/0011 |
| WO | WO-2018229871 A1 * | 12/2018 | | B60W 60/00256 |
| WO | 2019010021 | 1/2019 | | |
| WO | WO-2019055690 A1 * | 3/2019 | | B64C 27/08 |
| WO | WO-2019222860 A1 * | 11/2019 | | |
| WO | WO-2019225762 A1 * | 11/2019 | | |
| WO | WO-2019235418 A1 * | 12/2019 | | B64C 39/024 |
| WO | WO-2019235460 A1 * | 12/2019 | | |
| WO | WO-2020041898 A1 * | 3/2020 | | G01C 11/025 |
| WO | WO-2020225634 A1 * | 11/2020 | | G01C 21/3492 |
| WO | WO-2021202202 A2 * | 10/2021 | | B64C 39/024 |

OTHER PUBLICATIONS

Mell, Peter et al.; "The NIST Definition of Cloud Computing;" National Institute of Standards and Technology; Special Publication 800-145; Sep. 2011; 7 pages.

Bell, Karissa; Game developers can now use Google Maps to build the next "Pokemon go"; https://mashable.com/2018/03/14/google-maps-api-game-developers/#KITKBulrtgqt; Mar. 14, 2018; 7 pages.

First Prime Air Delivery; https://www.amazon.com/Amazon-Prime-Air/b?node=8037720011; retrieved from the Internet Mar. 18, 2019; 5 pages.

Regev, Amit; Drone Deliveries Are No Longer Pie in the Sky; http://web.archive.org/web/20181015174127/https://www.forbes.com/sites/startupnationcentral/2018/04/10/drone-deliveries-are-no-longer-pie-in-the-sky/#15aa918c4188; Oct. 14, 2018; 4 pages.

Williams, Brett; Drones that pass packages to each other could be the future of home delivery; https://mashable.com/2017/04/26/IBM-delivery-drone-patent/#oOPoXpO50aqW; Apr. 26, 2017; 8 pages.

YouTube; UPS Tests Residential Delivery via Drone; https://www.youtube.com/watch?v=xx9_60yjJrQ; Feb. 17, 2017; 3 pages.

* cited by examiner

INTELLIGENT VEHICLE DELIVERY

BACKGROUND

The present invention relates generally to a method for delivering a package to location and in particular to a method and associated system for determining delivery actions associated with environmental conditions with respect to delivering a product to a specified location.

SUMMARY

A first aspect of the invention provides a vehicle delivery method comprising: receiving, by a computer processor of control hardware associated with controlling a plurality of delivery vehicles, online order data comprising details associated with a product being ordered by a user; analyzing, by the processor, the online order data and environmental data associated with delivery of the product; generating, by the processor based on results of the analyzing, a travel route for delivering the product to a specified location of the user; selecting, by the processor based on the results of the analyzing, a first delivery vehicle of the plurality of delivery vehicles for delivering the product to the specified location of the user; directing, by the computer processor, the first delivery vehicle to a storage location of the product such that the first delivery vehicle initiates motion and travels to the storage location, wherein the product is loaded on the first delivery vehicle upon arrival at the storage location; directing, by the computer processor, the first delivery vehicle from the storage location to the specified location of the user, via the travel route, such that the first delivery vehicle initiates motion and travels to the specified location of the user; receiving, by the processor from sensors of the first delivery vehicle, data indicating current environmental conditions associated with the specified location; determining, by the processor based on the data indicating current environmental conditions, delivery actions associated with the product with respect to the specified location; and executing, by the processor based, the delivery actions.

A second aspect of the invention provides a computer program product, comprising a computer readable hardware storage device storing a computer readable program code, the computer readable program code comprising an algorithm that when executed by a computer processor of control hardware associated with controlling a plurality of delivery vehicles implements a vehicle delivery method, the method comprising: receiving, by the computer processor, online order data comprising details associated with a product being ordered by a user; analyzing, by the processor, the online order data and environmental data associated with delivery of the product; generating, by the processor based on results of the analyzing, a travel route for delivering the product to a specified location of the user; selecting, by the processor based on the results of the analyzing, a first delivery vehicle of the plurality of delivery vehicles for delivering the product to the specified location of the user; directing, by the computer processor, the first delivery vehicle to a storage location of the product such that the first delivery vehicle initiates motion and travels to the storage location, wherein the product is loaded on the first delivery vehicle upon arrival at the storage location; directing, by the computer processor, the first delivery vehicle from the storage location to the specified location of the user, via the travel route, such that the first delivery vehicle initiates motion and travels to the specified location of the user; receiving, by the processor from sensors of the first delivery vehicle, data indicating current environmental conditions associated with the specified location; determining, by the processor based on the data indicating current environmental conditions, delivery actions associated with the product with respect to the specified location; and executing, by the processor based, the delivery actions.

A third aspect of the invention provides a computer program product, comprising a computer readable hardware storage device storing a computer readable program code, the computer readable program code comprising an algorithm that when executed by a computer processor of control hardware associated with controlling a plurality of delivery vehicles implements a vehicle delivery method, the method comprising: receiving, by the computer processor, online order data comprising details associated with a product being ordered by a user; analyzing, by the processor, the online order data and environmental data associated with delivery of the product; generating, by the processor based on results of the analyzing, a travel route for delivering the product to a specified location of the user; selecting, by the processor based on the results of the analyzing, a first delivery vehicle of the plurality of delivery vehicles for delivering the product to the specified location of the user; directing, by the computer processor, the first delivery vehicle to a storage location of the product such that the first delivery vehicle initiates motion and travels to the storage location, wherein the product is loaded on the first delivery vehicle upon arrival at the storage location; directing, by the computer processor, the first delivery vehicle from the storage location to the specified location of the user, via the travel route, such that the first delivery vehicle initiates motion and travels to the specified location of the user; receiving, by the processor from sensors of the first delivery vehicle, data indicating current environmental conditions associated with the specified location; determining, by the processor based on the data indicating current environmental conditions, delivery actions associated with the product with respect to the specified location; and executing, by the processor based, the delivery actions.

The present invention advantageously provides a simple method and associated system capable of determining an area for delivery of packages.

BRIEF DESCRIPTION OF THE DRAWINGS

FIG. 4 FIG. 4 including

DETAILED DESCRIPTION

Figure 1:
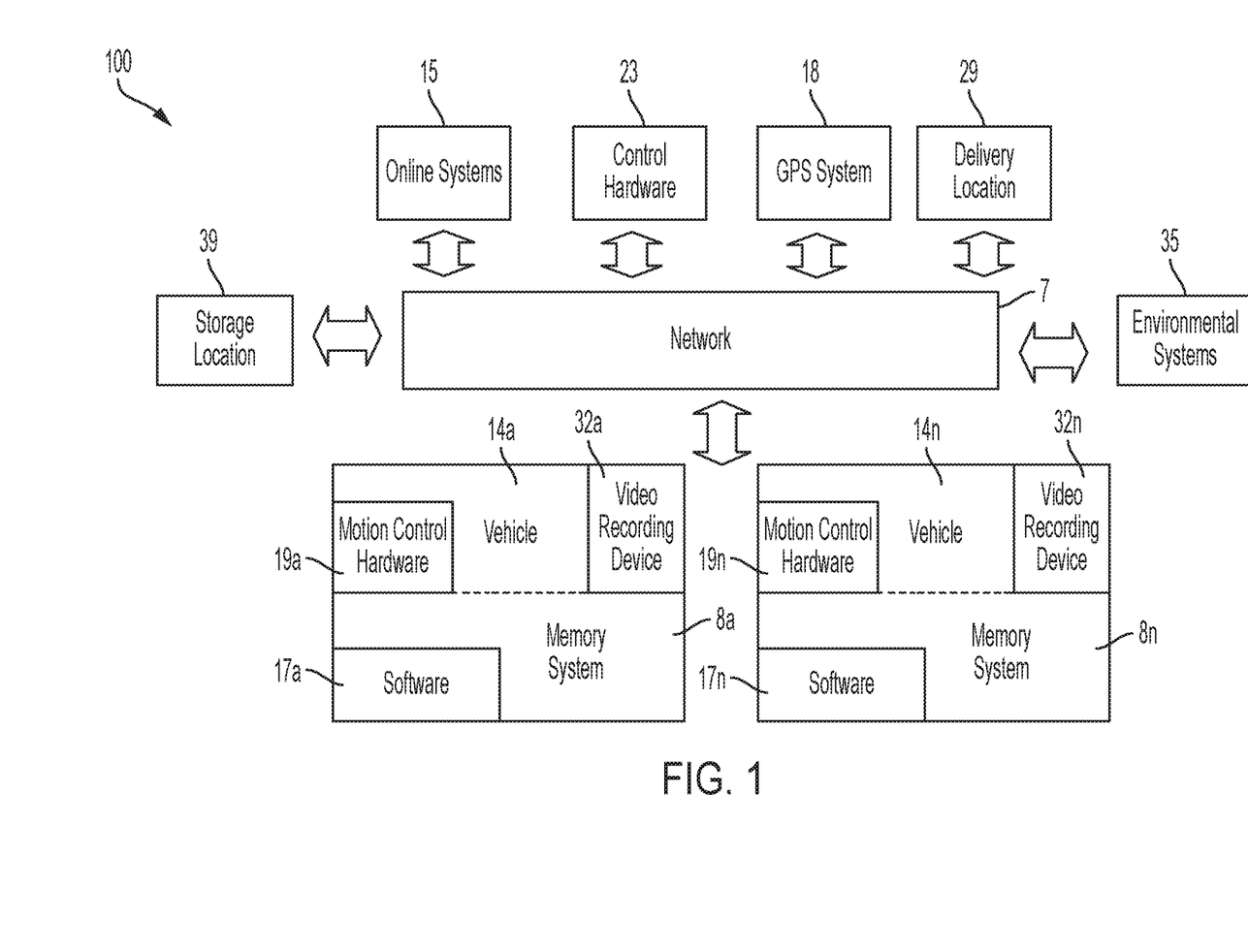
FIG. 1 illustrates a system for determining delivery actions associated with environmental conditions with respect to delivering a product to a specified location, in accordance with embodiments of the present invention

FIG. 1 illustrates a system 100 for determining delivery actions associated with environmental conditions with respect to delivering a product to a specified location, in accordance with embodiments of the present invention. Typical package delivery system technologies are currently being tested by industrial entities. However, many of these technologies are inaccurate with respect to specified use cases. Current technologies are unable to deliver a package based on collective knowledge associated with an environment of a target location. Therefore, system 100 enables a process for intelligently improving vehicle technology with respect to delivering packages based on detected environmental intricacies and geographical maps with respect to time constraints.

System 100 is enabled to detect coordinates and associated travel routes via analysis of location-based data. Likewise, system 100 provides control attributes for enabling delivery vehicles to detect/recognize home construction types, environmental hazards and conditions, and receive a plurality of model enhancing inputs via trained corpus code to improve a position for delivery with respect to an explicit residence. Subsequently, system 100 is trained to recognize prime delivery locations for reducing a risk of package damage, removal, retrieval inconvenience, and/or misrouting.

System 100 enables a process for continually tracking environmental information with respect to package delivery via multiple vehicles and augmenting a specialized memory implemented with respect to improved routing and optimization of future vehicle deliveries. Additionally, environmental information may be retrieved via vehicles for improving optimization of future deliveries.

System 100 enables the following features with respect to vehicular deliveries:
1. Enabling a vehicle to recognize: home construction types, environmental hazards/conditions, contents of the package being delivered, instructions associated with delivery of a package, and a plurality of model enhancing inputs via a trained corpus to better position and deliver the packages at a residence.
2. Enabling a vehicle to recognize good delivery conditions thereby reducing risk of damage, removal, inconvenience to retrieve, and interception and/or misrouting of packages.
3. Capturing post-delivery and consumer feedback (with respect to a delivery) to indicate a satisfaction level associated with a delivery process. The post-delivery and consumer feedback is integrated into a knowledge corpus data store as a means to improve environmental labeling for relevance.

System 100 of FIG. 1 includes a storage location 39, control hardware (i.e., a vehicle control system) 23, a GPS system 18, a delivery location, and environmental systems 35 connected through a network to vehicles 14a ... 14n. Vehicles 14a ... 14n (i.e., motion control hardware 19a ... 19n internal to vehicles 14a ... 14n), control hardware 23, and GPS system 18 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, vehicles 14a ... 14n (i.e., motion control hardware 19a ... 19n internal to vehicles 14a ... 14n), control hardware 23, and GPS system 18 may each comprise a specialized hardware device comprising specialized (non-generic) hardware and circuitry (i.e., specialized discrete non-generic analog, digital, and logic-based circuitry) for executing a process described with respect to FIGS. 1-7. The specialized discrete non-generic analog, digital, and logic based circuitry may include proprietary specially designed components (e.g., a specialized integrated circuit designed for only implementing an automated process for directing vehicles 14a ... 14n to deliver a package to a specified location). Vehicles 14a ... 14n include memory system 8a ... 8n, software 17a ... 17n, video recording devices 32a ... 32n (e.g., a video camera), and motion control hardware 19a ... 19n (all sensors and associated control hardware for enabling software 17a ... 17n to execute a process for directing vehicles 14a ... 14n to deliver a package to a specified location). Vehicles 14a ... 14n may comprise any vehicle that does not require a human operator to be located within the vehicles 14a ... 14n such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable a vehicle to know it's location and self-determine a route to deliver a package to a location dynamically), a pre-programmed vehicle, etc. Alternatively, vehicles 14a ... 14n may comprise any type of vehicle that includes a human operator located within the vehicle (e.g., an aircraft, an automobile, a boat or ship, a train, etc.). Vehicles 14a ... 14n may include, inter alia, an aerial vehicle, a land-based vehicle, a marine (water) based vehicle, etc. Sensors (within motion control hardware 19a ... 19n) may include, inter alia, GPS sensors, temperature sensors, pressure sensors, infrared sensors, motion sensors, a microphone, optical sensors, a thermal imaging apparatus/sensor, optical and vibrational sensors, voltage sensors, RFID sensors, etc. The memory system 8 may include a single memory system. Alternatively, the memory system may include a plurality of memory systems. Network 7 may include any type of network including, inter alia, a local area network, (LAN), a wide area network (WAN), the Internet, a wireless network, etc.

System 100 enables the following process with respect to optimizing vehicular delivery routes and selecting associated vehicles for deliveries:

The process is initialized when vehicular delivery routes are optimized based on: detected environmental conditions, delivery package contents, and conditions of a delivery location associated with the package being delivered. Subsequently, a vehicle is identified from a group of vehicles for delivery of the package based on an optimized delivery route, conditions associated with the optimized delivery route, current weather information, predicted future weather information, contents of the package being delivered, and instructions associated with delivery of the package. Additionally, one or more audio and visual data gathered during delivery along the route may be stored for future use. An additional risk score associated with a delivery location may be calculated based on: address verification, R-CNN contextualization of stored delivery locations, historical data, object recognition, options for package placements, a value of a package, and possibility of removal.

Figure 2:
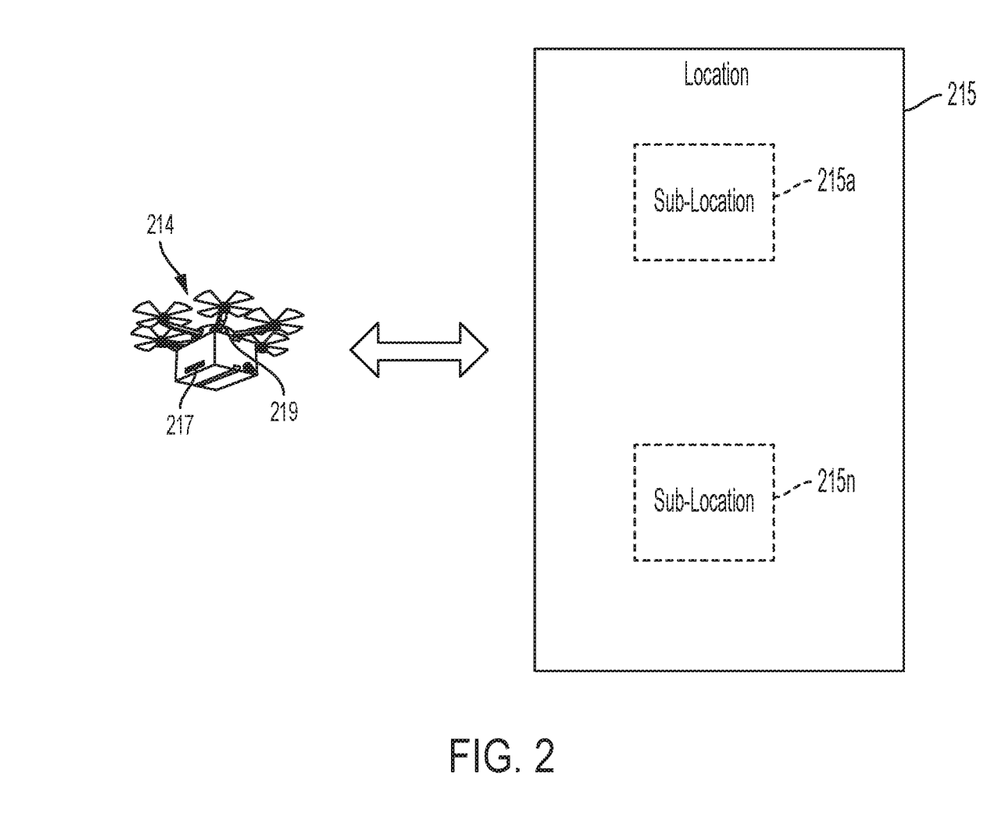
FIG. 2 illustrates an internal view of a geographical location associated with a package delivery process, in accordance with embodiments of the present invention.

FIG. 2 illustrates an internal view of a geographical location 215 associated with a package delivery process, in accordance with embodiments of the present invention. Geographical location 215 and vehicle 214 represent detailed views of delivery location 29 and vehicle(s) 14a . . . 14n (of FIG. 1), respectively. Vehicle 214 comprises a video retrieval device 219 and is carrying a package 217 for delivery. Geographical location 215 comprises sublocations 215a . . . 215n for delivery of package 217. Vehicle 214 may include an optional in-flight tracking module comprising API integration code for integrating with geolocation software for directing vehicle 214 via an intended path for delivery and an actual flight path in real time.

A process for determining alternate delivery locations (e.g., sub-locations 215a . . . 215n) may be implemented based on detecting multiple individuals possibly interfering with vehicle 214 and package 217. Additionally, there may be a lack of infrastructure for secure delivery. For example (with respect to a typical residential house), a mail box may not include a secure structure for delivery. Therefore, vehicle 214 determines a delivery location and a predicted location of an individual such that a mapping application may determine where a user is located currently and may additionally determine a future location for the user. For example, a first user frequently works between certain hours of certain days at a coffee shop. Additionally, the first user shops weekly at specified market. Therefore, an IoT device of the first user may automatically determine a current and predicted location with a high degree of accuracy. Likewise, if a mobile device of the first user detect that the first user is proceeding to the specified market, associated information may be communicated to a vehicle control station and pending packages may be delivered there. Such that the first user may retrieve the packages during the trip to the specified market.

Figure 3:
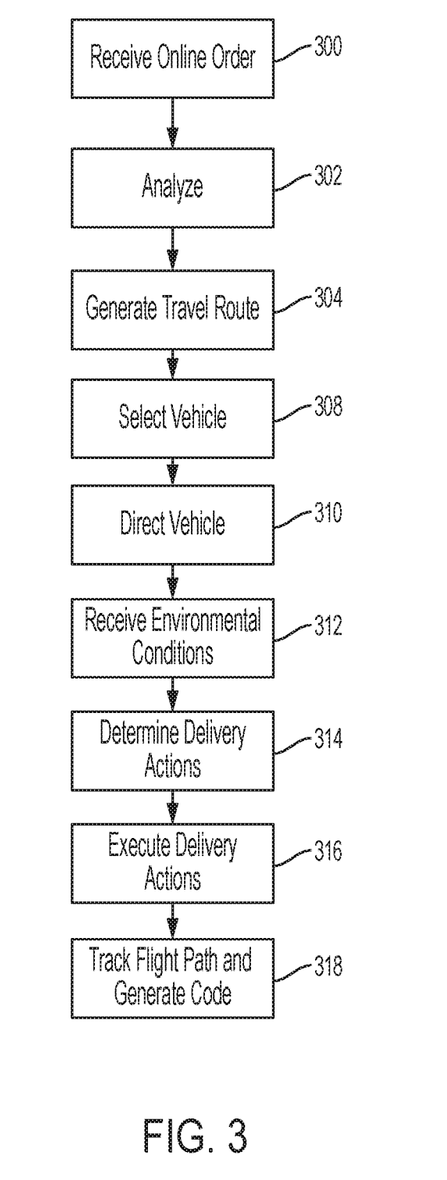
FIG. 3 illustrates an algorithm detailing a process flow enabled by the system of FIG. 1 for determining delivery actions associated with environmental conditions with respect to delivering a product to a specified location, in accordance with embodiments of the present invention.

FIG. 3 illustrates an algorithm detailing a process flow enabled by system 100 of FIG. 1 for determining delivery actions associated with environmental conditions with respect to delivering a product to a specified location, in accordance with embodiments of the present invention. Each of the steps in the algorithm of FIG. 3 may be enabled and executed in any order by a computer processor(s) executing computer code. Additionally, each of the steps in the algorithm of FIG. 3 may be enabled and executed in combination by control hardware 23, and vehicles 14a . . . 14n of FIG. 1. In step 300, online order data is received by control hardware associated with controlling delivery vehicles. The control hardware includes details associated with a product being ordered by a user. The online order data may include details associated with a sensitivity and expense of the product being ordered by the user. Additionally, the process for collecting user data (associated with the online order) is executed based on an approval by the user. Such approval also includes a user's option to cancel such collecting, and thus opt/in and opt/out of collecting user data at the user's discretions. Further, any data collected is understood to be intended to be securely stored and unavailable without user authorization. In step 302, online order data and environmental data associated with delivery of the product is analyzed. In step 304, a travel route for delivering the product to a specified location of the user is generated based on results of the analysis. In step 308, a delivery vehicle (of the delivery vehicles) is selected for delivering the product to the specified location of the user. In step 310, the delivery vehicle is directed to a storage location of of the product such that the delivery vehicle initiates motion and travels to the storage location. Likewise, the product is loaded on the delivery vehicle upon arrival at the storage location. Subsequently, the delivery vehicle is directed from the storage location to the specified location of the user via the travel route such that the delivery vehicle initiates motion and travels to the specified location of the user. In step 312, data indicating current environmental conditions associated with the specified location is received from sensors of the delivery vehicle (e.g., the delivery vehicle may be located within a specified perimeter surrounding the delivery vehicle). The data indicating current environmental conditions may include, inter alia, audio and video data, weather related data, congestion-based data, etc.

In step 314, delivery actions are determined based on the data indicating current environmental conditions. The delivery actions are associated with the product with respect to the specified location. Determining the delivery actions may include determining a risk score associated with the specified location based on an address verification process, a R-CNN contextualization process associated with stored delivery locations, historical data, an object recognition process, options for product placement, a value of the product, etc.

In step 316, the delivery actions are executed. Executing the delivery actions may include the following scenarios:
1. Determining that the package should not be delivered at the specified location and directing the delivery vehicle from the specified location to the storage location via the travel route such that delivery vehicle initiates motion and travels to the storage location.
2. Determining that the package should be delivered at the specified location and delivering the product to the user at the specified location.
3. Determining a specified sublocation within the specified location and determining that the user is currently located at the sublocation such that the product is delivered to the user at the sublocation.

In step 318, a flight path of the delivery vehicle associated with the travel route is tracked and feedback data associated with the delivery actions is received from the user. The feedback data and the data indicating current environmental conditions are stored within a specialized memory structure. Self-learning software code for executing future processes associated with the vehicle delivery method is generated based on the feedback data and the data indicating current environmental conditions.

Figure 4A:
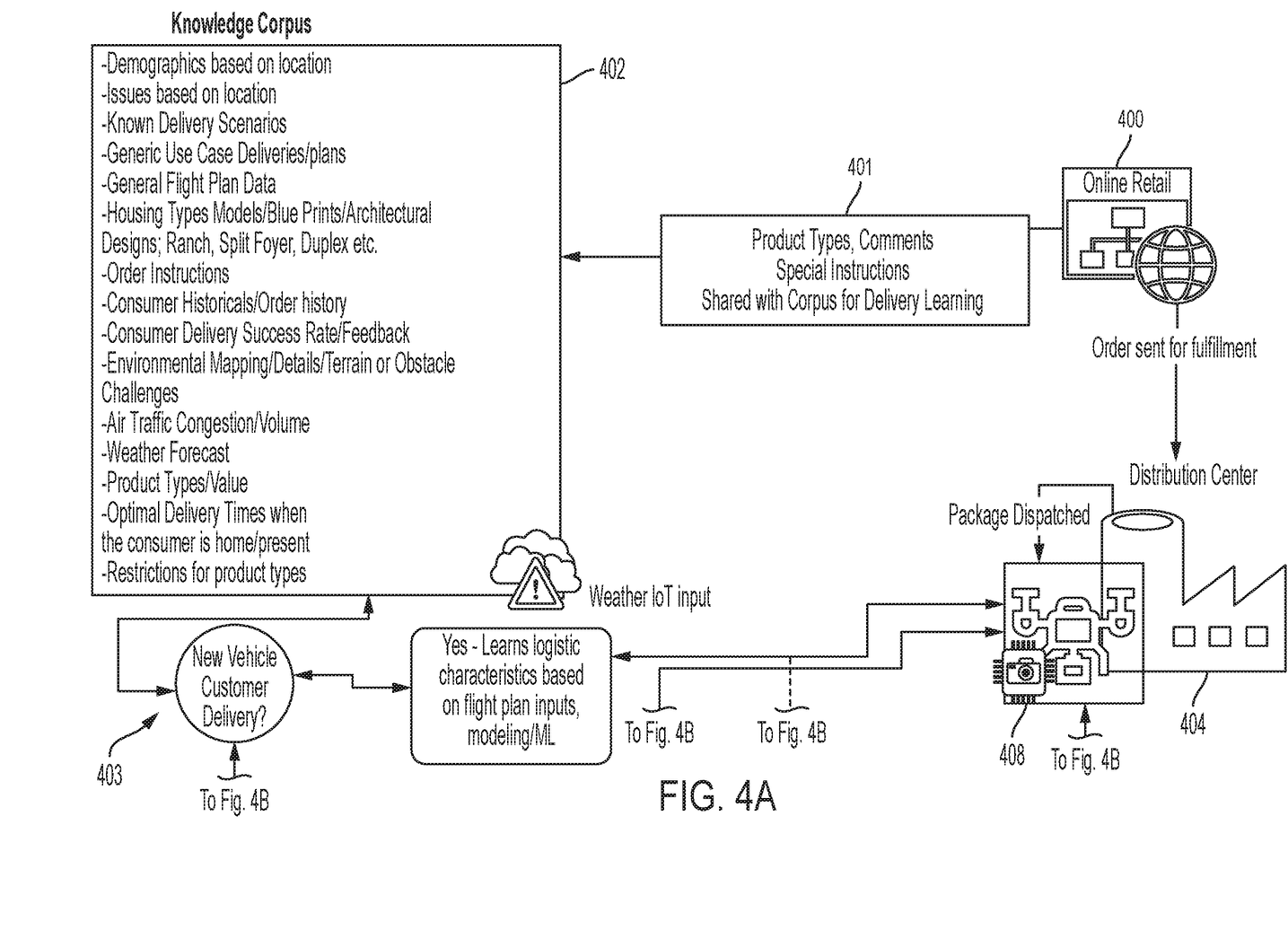
FIGS. 4A, 4B, and 4C, illustrates an implementation example for improving a delivery process, in accordance with embodiments of the present invention.
Figure 4B:
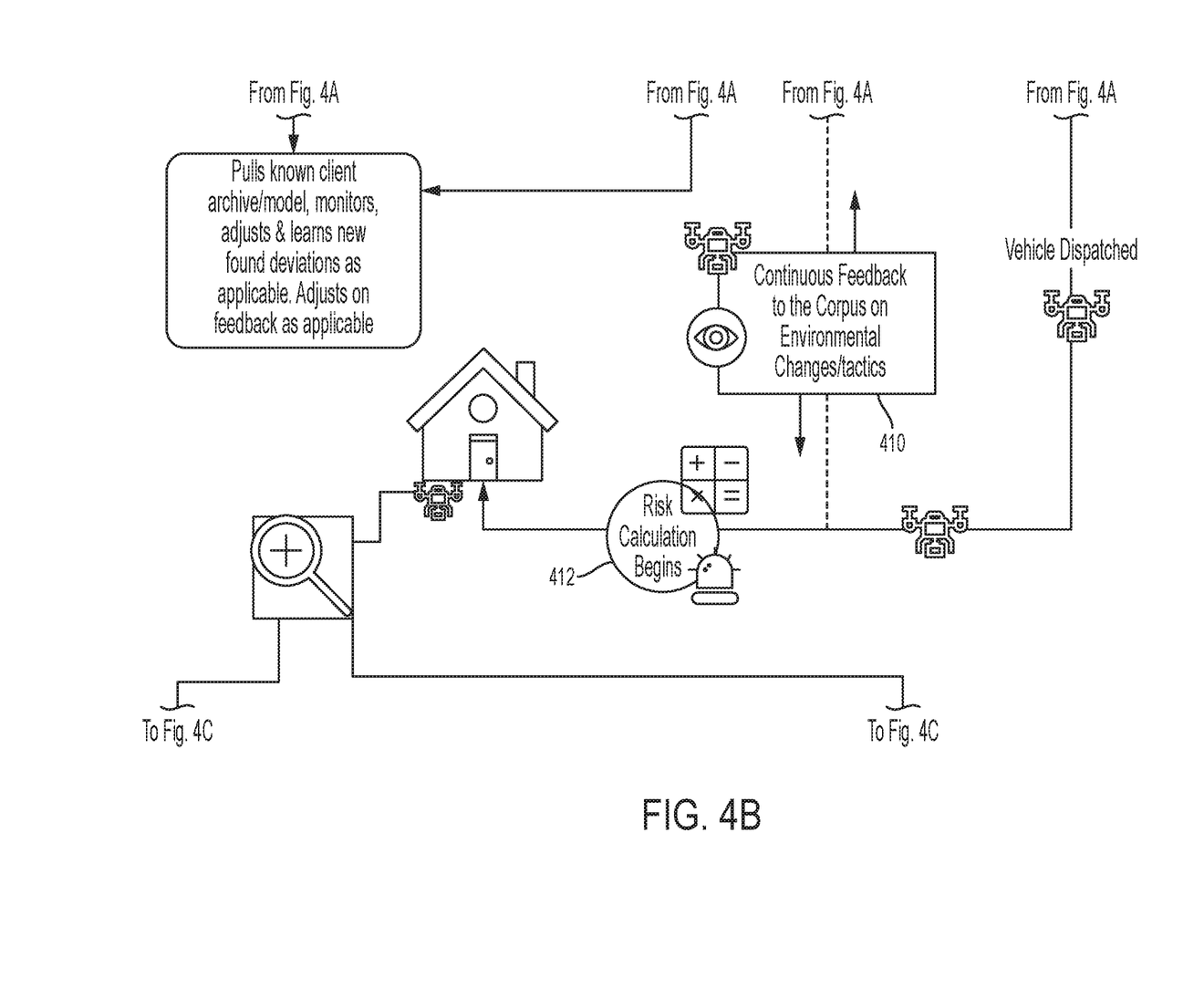
Figure 4C:
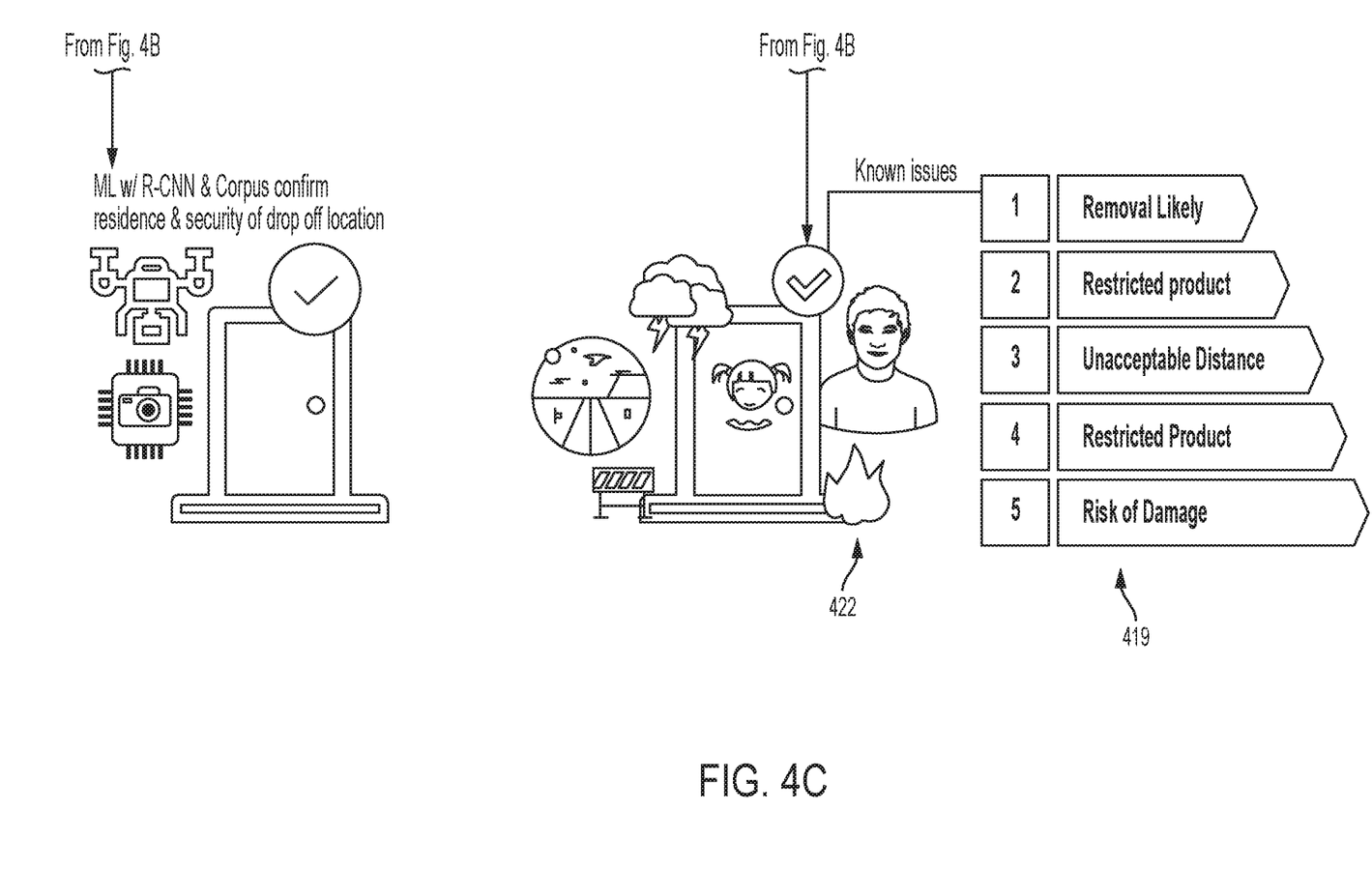

FIG. 4 including FIGS. 4A, 4B, and 4C, illustrates an implementation example for improving a delivery process, in accordance with embodiments of the present invention. The example is initiated when a customer places an online order via an online cart/checkout process with an online retailer 400 that leverages vehicle deliveries within its logistics solutions and platforms systems. The logistics solutions and platforms systems transmits pertinent shopping details to the customers knowledge corpus 402. For example, the knowledge corpus 402 may include product details, fragility, special comments in order, etc. In response, a vehicle management system (DMS) 403 configures a flight plan leveraging vehicle delivery mechanisms. (DMS) 403 may leverage ML, rule-based, and optimization algorithms/code to plan a route/time/location for delivering a package and identifying a vehicle for delivery. DMS 403 may rely on several factors of information such as, inter alia:

1. A consumer knowledge corpus including environmental information with respect to a target delivery location based on assessments and feedback provided by additional vehicles/devices.
2. Weather information with respect to an impact on a travel time and selection of vehicles.
3. Product/package information such as a sensitivity, fragile attributes, expense attributes, etc.
4. Package order instructions.

A distribution center 404 receives the order and prepares products and packages for delivery. Packages are loaded on a vehicle for delivery. The vehicle is dispatched 408 from distribution center 404 with respect to information from the consumer's knowledge corpus DMS instructions to enhance in-flight routing details and provide corpus real-time feedback via RCNN, location data, weather, and additional inputs during travel. Corpus data is retrieved and maintained in a central data store for leveraging for future enhancements/improvements via machine learning/model enhancements. The system/vehicle communicates with the customer via an online platform 410 for real time tracking of package delivery as applicable/required/desired by the customer. The vehicle approaches a residence 417 to finalize delivery and begins assessing environmental contexts to compute a risk score 412 based on address verification via gps/location-based indicators/tokens; R-CNN contextualization leveraging corpus of house types, historical data, front-door recognition; product placement options that are safe, logical, and distance appropriate; product value/insurance; possibility of removal, damage; etc. During risk score 412 calculations, newly identified real-time inputs are analyzed to execute a delivery decision based on appropriate threshold calculations. Contextual updates with respect to the surrounding environment are fed back to the customers knowledge corpus 402. Additionally, post-delivery, customer feedback 422 is captured to indicate a satisfaction with the delivery process. For example, was the packaged delivered on-time?, was the package delayed? Was the package damaged?, etc. A resulting customer satisfaction score is integrated into the consumer knowledge corpus 402 data store as a means to label environmental information for relevance. The environmental information, risk scores, and delivery decisions enabled via the vehicles (for customers with high satisfaction scores) are labeled as positive indicators. Likewise, environment information, risk scores, and delivery decisions enabled via the vehicles for customers with low satisfaction scores are labeled as negative indicators. Subsequently, the consumer knowledge corpus 402 and associated positive/negative labels 419 are leveraged by the DMS to execute improved routing/delivery decisions.

Figure 5:
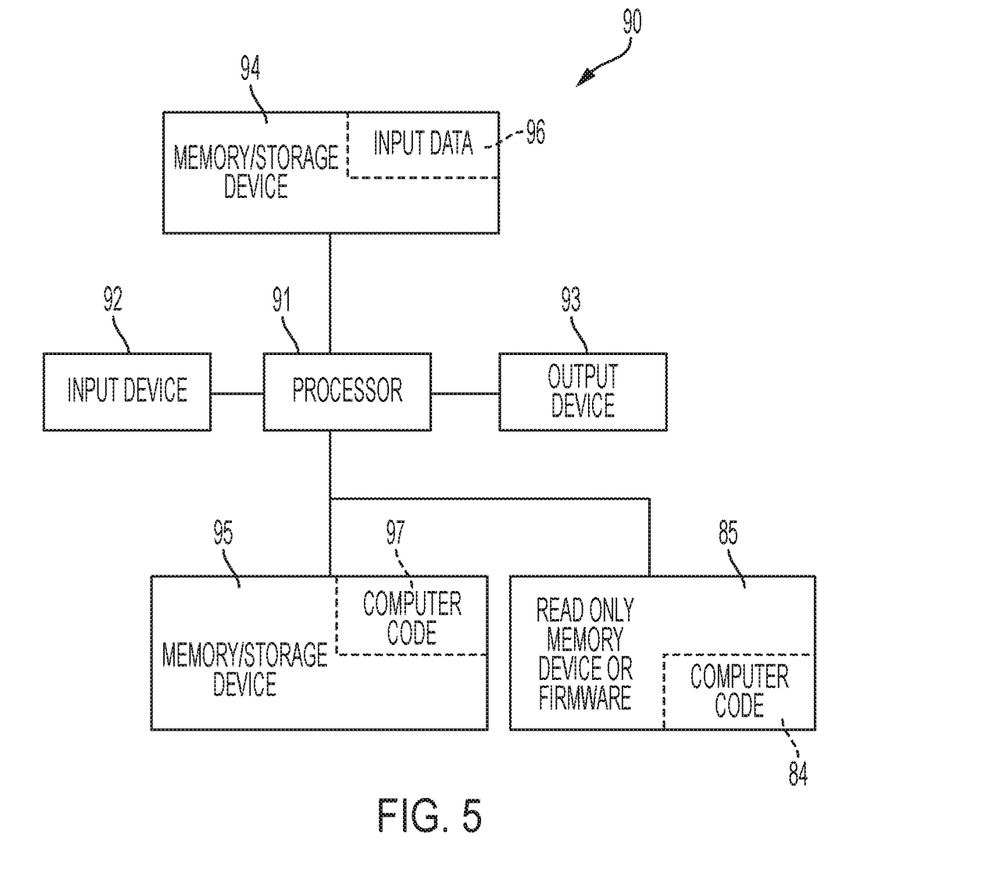
FIG. 5 illustrates a computer system used by the system of FIG. 1 for determining delivery actions associated with environmental conditions with respect to delivering a product to a specified location, in accordance with embodiments of the present invention.

FIG. 5 illustrates a computer system 90 (e.g., control hardware 23 and/or vehicles 104a . . . 104n of FIG. 1) used by or comprised by the system of FIG. 1 for determining delivery actions associated with environmental conditions with respect to delivering a product to a specified location, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 3 and 4) for determining delivery actions associated with environmental conditions with respect to delivering a product to a specified location. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2 and 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve and determine delivery actions associated with environmental conditions with respect to delivering a product to a specified location. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving and determining delivery actions associated with environmental conditions with respect to delivering a product to a specified location. In another embodiment, the invention provides a business method that performs the process steps of the invention on a subscription, advertising, and/or fee basis. That is, a service supplier, such as a Solution Integrator, could offer to enable a process for improving and determining delivery actions associated with environmental conditions with respect to delivering a product to a specified location. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a configuration of hardware and software, any configuration of hardware and software, as would be known to a person of ordinary skill in the art, may be utilized for the purposes stated supra in conjunction with the computer system 90 of FIG. 5. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
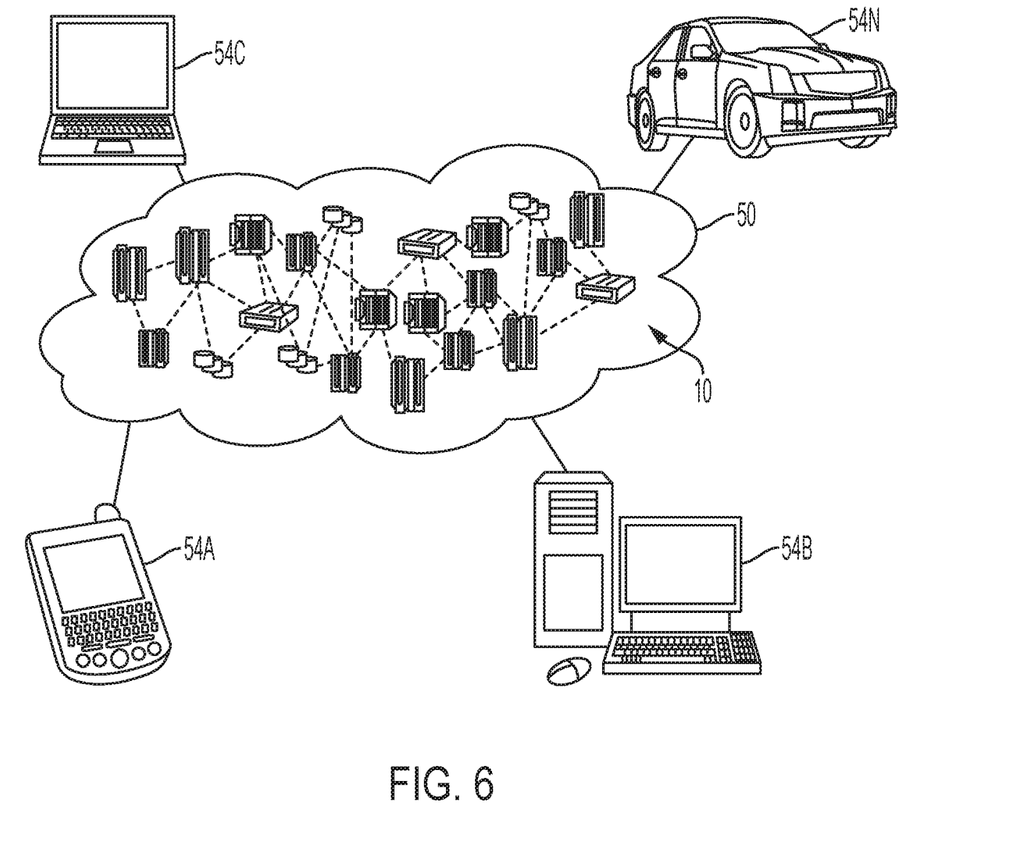
FIG. 6 illustrates a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 7:
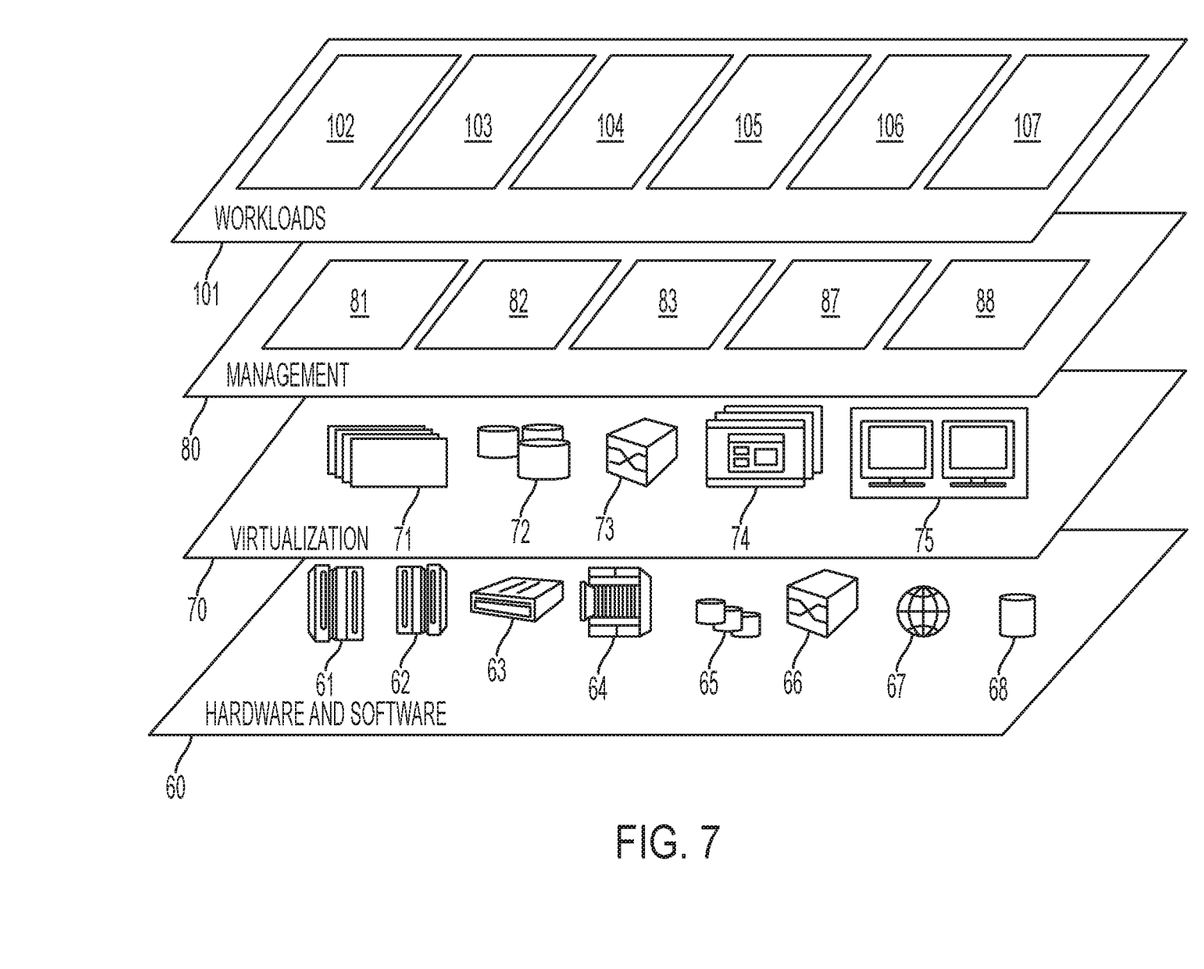
FIG. 7 illustrates a set of functional abstraction layers provided by cloud computing environment, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for determining delivery actions associated with environmental conditions with respect to delivering a product to a specified location 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A vehicle delivery method comprising:
receiving, by a computer processor of control hardware associated with controlling a plurality of delivery vehicles, online order data comprising details associated with a product being ordered by a user, wherein said details include a fragility of said product and special comments within said online order data;
analyzing, by said computer processor, said online order data and environmental data associated with delivery of said product;
generating, by said computer processor based on results of said analyzing, a travel route for delivering said product to a specified location of said user;
selecting, by said computer processor based on said results of said analyzing, a first delivery vehicle of said plurality of delivery vehicles for delivering said product to said specified location of said user;
directing, by said computer processor, said first delivery vehicle to a storage location of said product such that said first delivery vehicle initiates motion and travels to said storage location, wherein said product is loaded on said first vehicle upon arrival at said storage location;
directing, by said computer processor, said first delivery vehicle from said storage location to said specified location of said user, via said travel route, such that said first delivery vehicle initiates motion and travels to said specified location of said user;
receiving, by said computer processor from sensors of said first delivery vehicle, data indicating current environmental conditions associated with said specified location;
generating, by said computer processor, feedback associated with said current environmental conditions;
storing, by said computer processor, said feedback within a knowledge corpus for future usage;
detecting, by said computer processor via said sensors, construction data indicating a structure at said specified location;
integrating, by said computer processor, API integration code with geolocation software for directing, in real time, said first vehicle via an intended path and an actual flight path for delivery;
further detecting, by said computer processor, multiple individuals possibly interfering with said first delivery vehicle and said package;
determining, by said computer processor based on said data indicating current environmental conditions, and results of said integrating and said further detecting, delivery actions associated with delivering said product with respect to said specified location, wherein said determining said delivery actions comprises:
determining, during a travel to said specified location, a risk score associated with said specified location based on an address verification process, a R-CNN contextualization process associated with stored delivery locations, historical data, front-door recognition with respect to said specified location, an object recognition process, options for product placement, and a value of said product; and
executing, by said computer processor, said delivery actions.

2. The method of claim 1, further comprising:
receiving, by said computer processor from said user, feedback data associated with said delivery actions;
storing, by said computer processor within a specialized memory structure, said feedback data and said data indicating current environmental conditions; and
generating, by said computer processor based on said feedback data and said data indicating current environmental conditions, self learning software code for executing future processes associated with said vehicle delivery method.

3. The method of claim 1, further comprising:
tracking, by said computer processor, a flight path of said first delivery vehicle associated with said travel route.

4. The method of claim 1, wherein said executing said delivery actions comprises:
determining that said package should not be delivered at said specified location; and
directing said first delivery vehicle from said specified location of said user to said storage location, via said travel route, such that said first delivery vehicle initiates motion and travels to said storage location.

5. The method of claim 1, wherein said executing said delivery actions comprises:
  determining that said package should be delivered at said specified location; and
  delivering said product to said user at said specified location.

6. The method of claim 1, further comprising:
  determining a specified sublocation within said specified location; and
  determining that said user is currently located at said sublocation, wherein said delivering said product to said user at said specified location comprises delivering said product to said user at said sublocation.

7. The method of claim 1, wherein said data indicating current environmental conditions comprises audio and video data.

8. The method of claim 1, wherein said data indicating current environmental conditions comprises weather related data and congestion based data.

9. The method of claim 1, wherein said data indicating current environmental conditions is retrieved from said first delivery vehicle located within a specified perimeter surrounding said first delivery vehicle.

10. The method of claim 1, wherein said online order data comprises details associated with a sensitivity and expense of said product being ordered by said user.

11. The method of claim 1, further comprising:
  providing at least one support service for at least one of creating, integrating, hosting, maintaining, and deploying computer-readable code in the control hardware, said code being executed by the computer processor to implement: said receiving said online order data, said analyzing, said generating, said selecting, said directing said first delivery vehicle to said storage location, said directing said first delivery vehicle from said storage location, said receiving said data, said determining said delivery actions, and said executing.

12. A computer program product, comprising a computer readable hardware storage device storing a computer readable program code, said computer readable program code comprising an algorithm that when executed by a computer processor of control hardware associated with controlling a plurality of delivery vehicles implements a vehicle delivery method, said method comprising:
  receiving, by said computer processor, online order data comprising details associated with a product being ordered by a user, wherein said details include a fragility of said product and special comments within said online order data;
  analyzing, by said computer processor, said online order data and environmental data associated with delivery of said product;
  generating, by said computer processor based on results of said analyzing, a travel route for delivering said product to a specified location of said user;
  selecting, by said computer processor based on said results of said analyzing, a first delivery vehicle of said plurality of delivery vehicles for delivering said product to said specified location of said user;
  directing, by said computer processor, said first delivery vehicle to a storage location of said product such that said first delivery vehicle initiates motion and travels to said storage location, wherein said product is loaded on said first vehicle upon arrival at said storage location;
  directing, by said computer processor, said first delivery vehicle from said storage location to said specified location of said user, via said travel route, such that said first delivery vehicle initiates motion and travels to said specified location of said user;
  receiving, by said computer processor from sensors of said first delivery vehicle, data indicating current environmental conditions associated with said specified location;
  generating, by computer said processor, feedback associated with said current environmental conditions; storing, by said computer processor, said feedback within a knowledge corpus for future usage;
  detecting, by said computer processor via said sensors, construction data indicating a structure at said specified location;
  integrating, by said computer processor, API integration code with geolocation software for directing, in real time, said first vehicle via an intended path and an actual flight path for delivery;
  further detecting, by said computer processor, multiple individuals possibly interfering with said first delivery vehicle and said package;
  determining, by said computer processor based on said data indicating current environmental conditions, and results of said integrating and said further detecting, delivery actions associated with delivering said product with respect to said specified location, wherein said determining said delivery actions comprises:
  determining, during a travel to said specified location, a risk score associated with said specified location based on an address verification process, a R-CNN contextualization process associated with stored delivery locations, historical data, front-door recognition with respect to said specified location, an object recognition process, options for product placement, and a value of said product; and
  executing, by said computer processor, said delivery actions.

13. The computer program product of claim 12, wherein said method further comprises:
  receiving, by said computer processor from said user, feedback data associated with said delivery actions;
  storing, by said computer processor within a specialized memory structure, said feedback data and said data indicating current environmental conditions; and
  generating, by said computer processor based on said feedback data and said data indicating current environmental conditions, self learning software code for executing future processes associated with said vehicle delivery method.

14. The computer program product of claim 12, wherein said method further comprises:
  tracking, by said computer processor, a flight path of said first delivery vehicle associated with said travel route.

15. The computer program product of claim 12, wherein said executing said delivery actions comprises:
  determining that said package should not be delivered at said specified location; and
  directing said first delivery vehicle from said specified location of said user to said storage location, via said travel route, such that said first delivery vehicle initiates motion and travels to said storage location.

16. The computer program product of claim 12, wherein said executing said delivery actions comprises:
  determining that said package should be delivered at said specified location; and
  delivering said product to said user at said specified location.

17. The computer program product of claim 12, wherein said method further comprises:
- determining a specified sublocation within said specified location; and
- determining that said user is currently located at said sublocation, wherein said delivering said product to said user at said specified location comprises delivering said product to said user at said sublocation.

18. A control hardware device comprising a computer processor coupled to a computer-readable memory unit, said memory unit comprising instructions that when executed by the computer processor executes a vehicle delivery method comprising:
- receiving, by said computer processor, online order data comprising details associated with a product being ordered by a user, wherein said details include a fragility of said product and special comments within said online order data;
- analyzing, by said computer processor, said online order data and environmental data associated with delivery of said product;
- generating, by said computer processor based on results of said analyzing, a travel route for delivering said product to a specified location of said user;
- selecting, by said computer processor based on said results of said analyzing, a first delivery vehicle of said plurality of delivery vehicles for delivering said product to said specified location of said user;
- directing, by said computer processor, said first delivery vehicle to a storage location of said product such that said first delivery vehicle initiates motion and travels to said storage location, wherein said product is loaded on said first vehicle upon arrival at said storage location;
- directing, by said computer processor, said first delivery vehicle from said storage location to said specified location of said user, via said travel route, such that said first delivery vehicle initiates motion and travels to said specified location of said user;
- receiving, by said computer processor from sensors of said first delivery vehicle, data indicating current environmental conditions associated with said specified location;
- generating, by said computer processor, feedback associated with said current environmental conditions;
- storing, by said computer processor, said feedback within a knowledge corpus for future usage;
- detecting, by said computer processor via said sensors, construction data indicating a structure at said specified location;
- integrating, by said computer processor, API integration code with geolocation software for directing, in real time, said first vehicle via an intended path and an actual flight path for delivery;
- further detecting, by said computer processor, multiple individuals possibly interfering with said first delivery vehicle and said package;
- determining, by said computer processor based on said data indicating current environmental conditions, and results of said integrating and said further detecting, delivery actions associated with delivering said product with respect to said specified location, wherein said determining said delivery actions comprises:
- determining, during a travel to said specified location, a risk score associated with said specified location based on an address verification process, a R-CNN contextualization process associated with stored delivery locations, historical data, front-door recognition with respect to said specified location, an object recognition process, options for product placement, and a value of said product; and
- executing, by said computer processor, said delivery actions.

* * * * *